L. S. PFOUTS.
MOTOR VEHICLE.
APPLICATION FILED MAY 2, 1912.

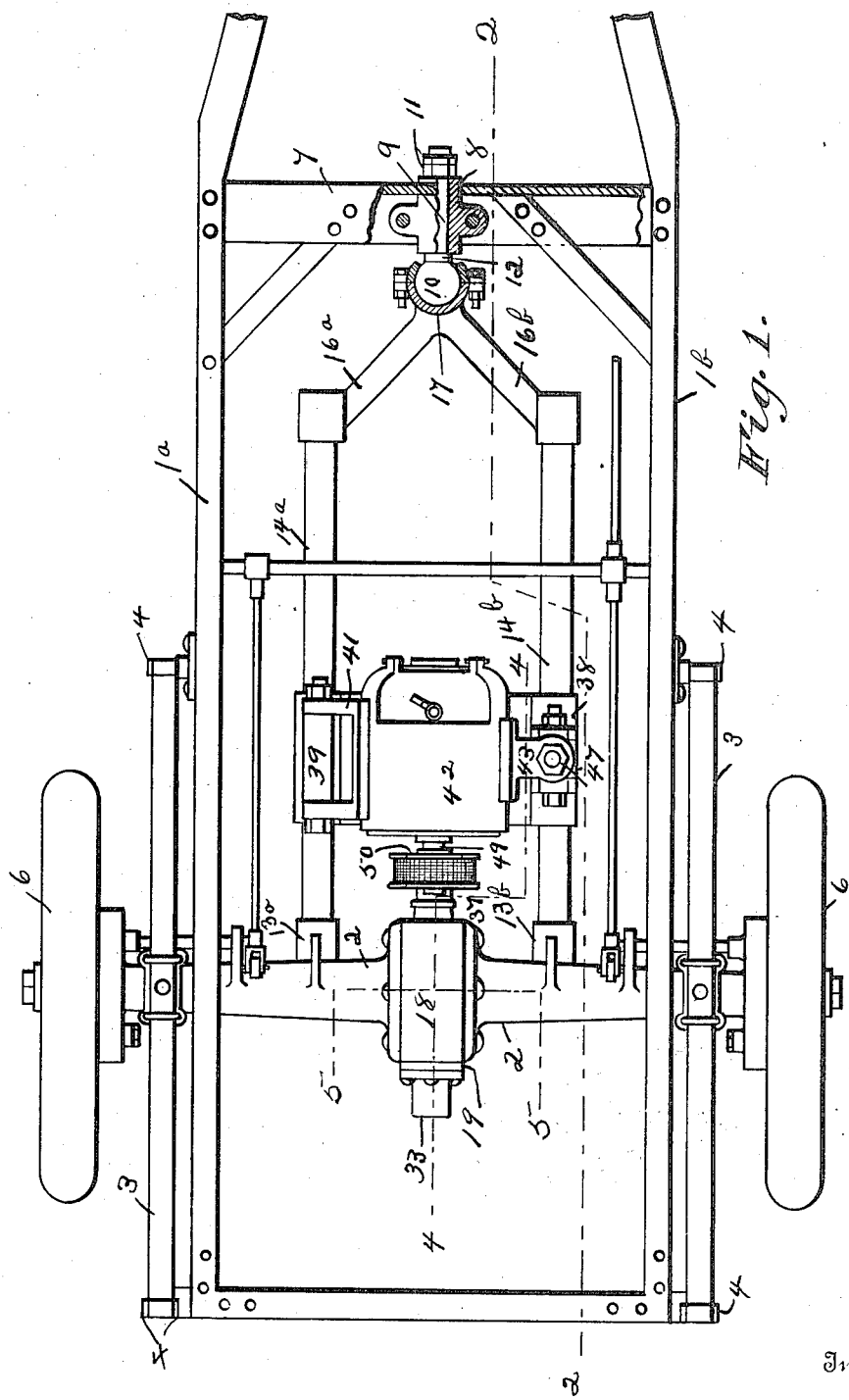

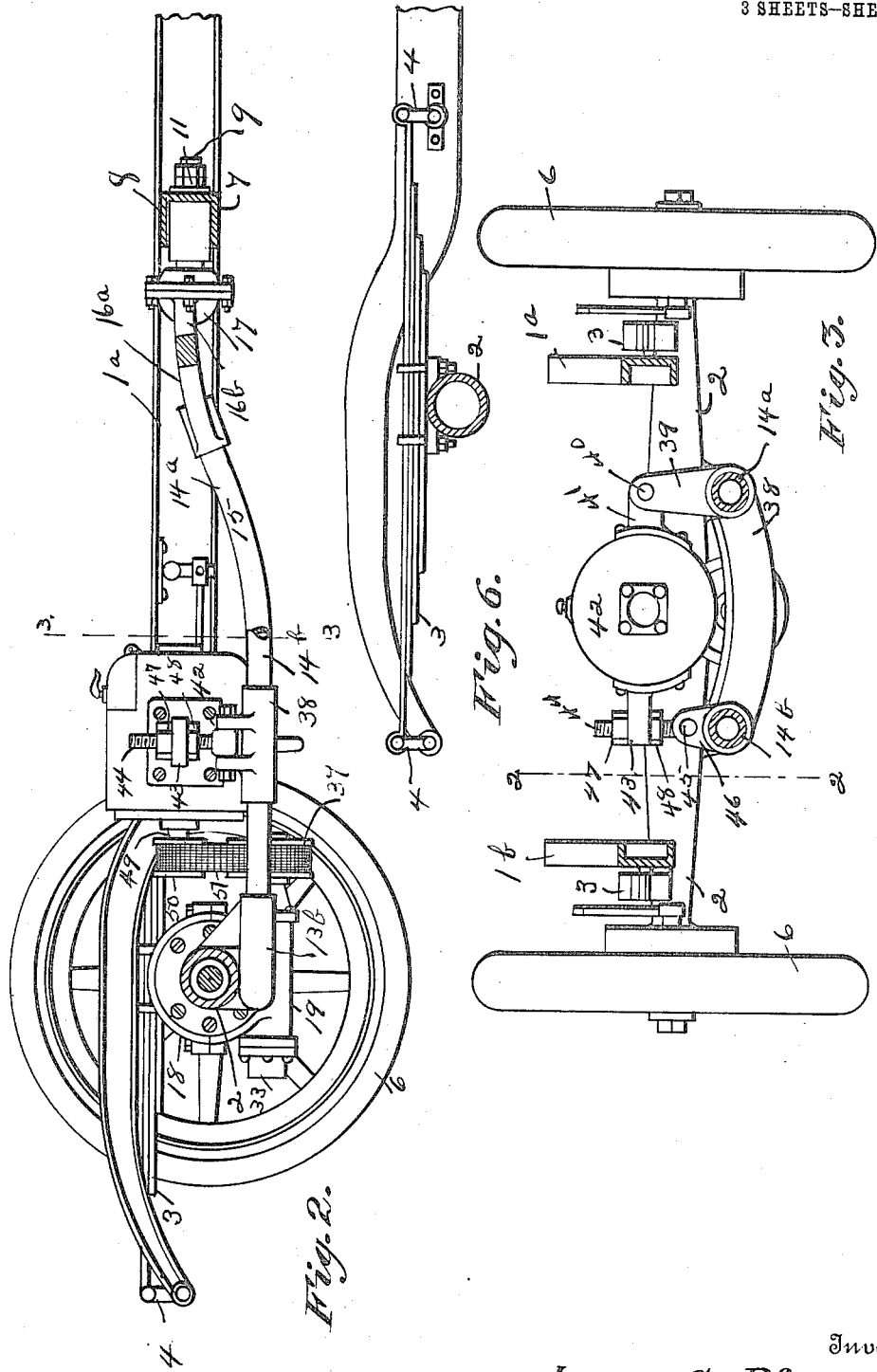

1,059,562.

Patented Apr. 22, 1913.
3 SHEETS—SHEET 3.

Witnesses
Sylvia Boron.
Hazel Owen.

Inventor
Leroy S. Pfouts.

By Bond & Miller
Attorneys

UNITED STATES PATENT OFFICE.

LEROY S. PFOUTS, OF CANTON, OHIO.

MOTOR-VEHICLE.

1,059,562. Specification of Letters Patent. Patented Apr. 22, 1913.

Application filed May 2, 1912. Serial No. 694,598.

*To all whom it may concern:*

Be it known that I, LEROY S. PFOUTS, a citizen of the United States, residing at Canton, in the county of Stark and State of Ohio, have invented a new and useful Motor-Vehicle, of which the following is a specification.

My invention relates to improvements in motor vehicles, and while applicable to various kinds of such vehicles, more especially relates to vehicles driven by electricity.

The objects of the invention are, to generally improve motor vehicles, to simplify the construction, thereby lessening the cost of manufacture, while at the same time producing a very durable device of great efficiency, accessibility for repairs when needed and adapted to operate quietly and smoothly.

Further objects are to provide a more firm and direct means for communicating the driving thrust from the rear wheels and axle to the frame of the vehicle; to permit the rear axle to be free to follow unevenness of the road at all times, thus utilizing the elasticity of the springs to a greater degree and to mount the motor on a sub-frame which will be elastic with respect to the main frame while maintaining relatively rigid relation with the rear axle.

A still further object is to provide a worm and gear driving mechanism for the rear axle which may be accurately adjusted and will be maintained in such accurate adjustment while permitting independent adjustment of the motor including desirable end play of the armature shaft while rotating.

These objects, together with other objects readily apparent to those skilled in the art, may be attained by the construction illustrated in the accompanying drawings, although the invention may be embodied in other forms, the construction illustrated being chosen by way of example.

Figure 4:
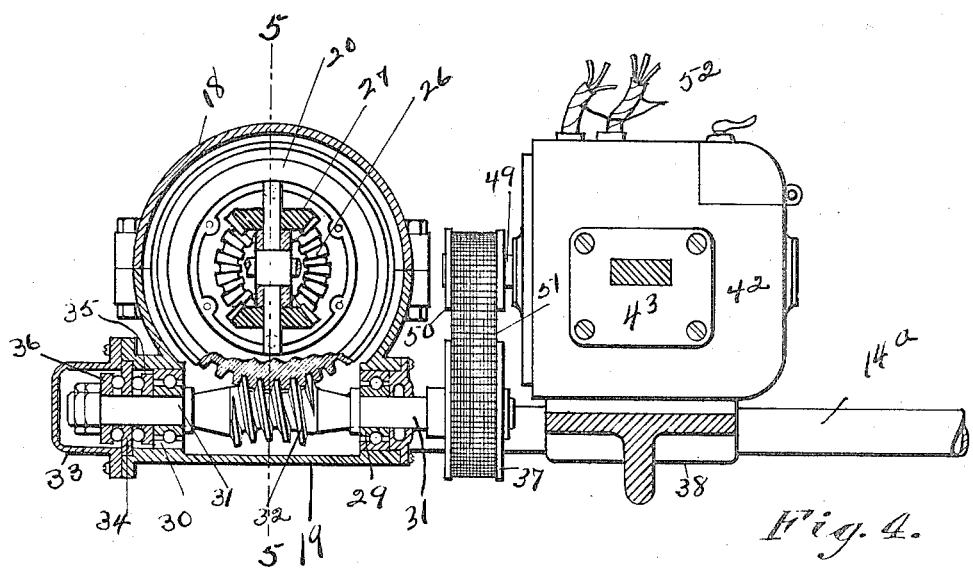
Figure 5:
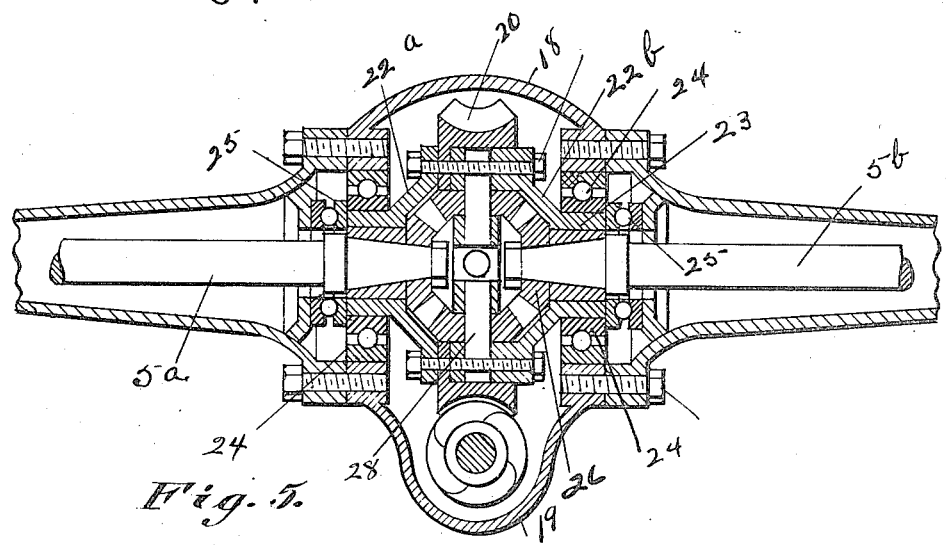

In the drawings Figure 1 is a top view of a portion of a chassis embodying my invention, said view including the rear axle, sub-frame, and a portion of the main frame. Fig. 2 is a side view of the same partly in elevation and partly in vertical longitudinal section on the line 2—2 of Fig. 1. Fig. 3 is a vertical transverse sectional view on the line 3—3 of Fig. 2. Fig. 4 is an enlarged fragmentary vertical longitudinal sectional view on the line 4—4 of Fig. 1 showing the construction of the differential and driving gears. Fig. 5 is a vertical transverse sectional view taken on the lines 5—5 of Figs. 1 and 4. Fig. 6 is a side elevation of the springs.

Throughout the several views similar reference numerals indicate similar parts.

More specifically describing the construction disclosed in said drawings, the numerals $1^a$ and $1^b$ indicate the two side pieces respectively of the main frame of the chassis upon which the body of the vehicle is intended to rest. Said side pieces preferably do not extend horizontally in the same plane for their entire length, but have their rear ends arched or curved upwardly where they extend over the rear axle housing 2, as shown in Fig. 2. The rear axle housing 2 is connected to the main frame by means of the rear springs 3 which are connected to said frame by means of the well known hanging links 4 to permit some longitudinal movement as between the main frame and said housing.

The two portions of the driving axle are designated $5^a$ and $5^b$ respectively and the driving wheels 6 are mounted at the outer ends of the housing 2 and operatively connected to the said two portions of the driving axle in any well known mechanical manner.

Forward of the housing 2 the main cross piece 7 of the main frame extends from the side piece $1^a$ to the side piece $1^b$, to which side pieces it is firmly connected. Intermediate the said side pieces, said cross piece is provided with a bearing 8 having its axis longitudinally disposed, and rotatably arranged in said bearing is a spindle 9 provided with the integral spherical thrust head 10 at its rear end and with appropriate means, such as the nuts 11 coöperating with the shoulder 12 formed integrally with the spindle 9 for preventing longitudinal movement of said spindle while permitting its rotation.

Formed integrally with the housing 2 are two spaced sub-frame connecting bosses $13^a$ and $13^b$ to which are fixedly connected the longitudinal sub-frame members $14^a$ and $14^b$ respectively, preferably of tubular form as clearly shown in Fig. 2. The axes of the rear ends of said members $14^a$ and $14^b$ are preferably below the housing 2 and said members extend forwardly, substantially in the same horizontal plane for a greater portion of their length, their forward ends however being upwardly curved as shown at 15 in Fig. 2 and their extreme forward ends being fixedly connected to the rear ends of the arms 16ª and 16ᵇ of the sub-frame yoke, which arms converge and are connected to the socket 17 which engages the spherical thrust head 10 as clearly shown in Fig. 1.

Preferably in the median longitudinal line of the vehicle the rear axle housing is provided with the differential gear case 18 and the worm case 19. Within the case 18 a differential gear connects the portions 5ª and 5ᵇ to the driving axle with a worm wheel 20. The type of differential gear disclosed in the drawings is that type known as the bevel compensating gear as distinguished from a spur gear construction. The worm wheel 20, by means of the bolts 21 is clamped between the two portions 22ª and 22ᵇ of the differential carrier, which carrier is provided with the integral hub portions 23 through which the inner ends of the portions 5ª and 5ᵇ of the driving axle extend and which, with said driving axle are rotatably mounted in the case 18 upon the radial ball bearings 24 and the thrust ball bearings 25. The inner ends of the portions 5ª and 5ᵇ of the driving axle are provided with the fixedly mounted bevel gears 26 meshing with four bevel gears 27 mounted upon the four integral stationary stub shafts 28 fixedly connected to the differential carrier and worm wheel 20.

Beneath the case 18 the longitudinally disposed worm case 19 is provided with the forward radial ball bearings 29 and the rear radial ball bearings 30 in which bearings is rotatably mounted the worm shaft 31 provided with the worm 32 meshing with the worm wheel 20. The rear end of the worm case 19 is provided with a removable cap 33 and with a thrust plate 34 preferably held in place by said removable cap. The shaft 31 extends rearwardly through said thrust plate and is provided with the forward and rear thrust ball bearings 35 and 36 respectively adapted to hold the shaft 31 against any longitudinal movement and thus maintain the worm 32 in accurate and fixed positional adjustment with relation to the worm wheel 20. The shaft 31 extends forward beyond the bearing 29 and is provided with a fixedly mounted sprocket 37.

Extending from the sub-frame member 14ª to the member 14ᵇ and fixedly connected thereto is the motor mounting yoke 38. Formed integrally with said yoke at the end thereof which is attached to the member 14ª is an upwardly extending motor connecting arm 39 to the upper end of which, at 40 is pivotally connected the hinge motor bracket 41 which is fixedly connected to the one side of the shell of the motor 42. An adjusting motor bracket 43 is similarly connected to the shell of the motor at its opposite side and a vertically disposed screw threaded adjusting stem 44, pivotally connected at 45 to upward projections 46, formed integral with the yoke 38 extends through a vertical aperture in said bracket 43 and is provided with the upper and lower adjusting nuts 47 and 48 respectively whereby said bracket 43 may be vertically adjusted with relation to the sub-frame member 14ᵇ.

It should be noted that the armature shaft 49 of the motor 42 is longitudinally disposed, with its axis parallel to and above the axis of the shaft 31. Said shaft 49 is provided with a fixedly mounted sprocket 50, and a chain belt 51, preferably of the well known "silent chain construction" extends over and around the sprockets 37 and 50 to provide operative connection therebetween.

Suitable wire connections 52, shown in Fig. 4 as broken away, should of course be provided, as also a source of current, such as a storage battery and the controller, but these portions of the vehicle being common and well known, and forming no specific portion of the present invention, it is not necessary herein to disclose or describe. It will also be understood that the forward end of the chassis should be provided with a front axle and front wheels adapted for steering, as well known in the art.

It is a well known fact that the armature shaft of a motor should preferably have some end-play so that as the same revolves some endwise movement of said shaft may constantly take place in order to prevent the brushes from bearing upon the commutator in the same annular path, and thus distribute the wear of said brushes and commutator in such way as to keep the contacting surfaces of said parts in proper smooth condition. It should also be noted that by my invented construction herein disclosed the armature shaft of the motor is thus allowed to move, the chain belt 51 permitting such movement. It should be noted that the adjustment of such belt is very readily accomplished by turning the adjusting nuts 47 and 48. In fact the motor and its adjustment are so independent of the driving gear proper that the entire replacing of a motor is a very simple and easily accomplished task. Attention should also be called to the fact that there is no long driving or jack shaft employed in my invented construction, the shaft 31 being quite short and being for the greater part inclosed, thus effectually preventing accidental injury to or bending of said shaft.

The entire forward driving thrust produced by the rotation of the driving wheels will be communicated to the thrust head 10 and to the main cross piece 7 to which said head is connected. Said cross piece being arranged at the forward end of the main frame will have a steadying effect upon the operation of the vehicle and greatly increase its controllability. The sub-frame, together with the motor will be entirely free to follow any movements of the rear axle housing as the driving wheels move over the surface of the road without in the least straining the driving members or throwing said members out of alinement or adjustment with each other.

I claim:

1. A motor vehicle comprising, in combination with a rear driving axle, a housing therefor, a main frame and spring means connecting said main frame to said housing, said means permitting relative longitudinal movement between said housing and main frame; a sub-frame comprising two longitudinally disposed sub-frame members fixedly connected at their rear ends to said housing, and a sub-frame yoke connecting the front ends of said members, and said yoke pivotally and non-longitudinally movably connected to said main frame intermediate the front and rear wheels by ball and socket connecting means, a motor mounted upon said sub-frame; and operative connecting means between said motor and said rear axle, said sub-frame constituting the sole means for imparting the driving thrust from said housing to said main frame.

2. A motor vehicle comprising, in combination with a main frame, a rear driving axle and housing therefor, a worm wheel connected to said axle, a shaft provided with a worm meshing with said worm wheel, said shaft provided with a fixedly mounted sprocket wheel, a sub-frame connected at its rear end to said housing and at its front end to said main frame, a motor mounted upon said sub-frame, the shaft of said motor provided with a fixedly mounted sprocket wheel, and a chain operatively connecting said sprocket wheels.

3. A motor vehicle comprising, in combination with a main frame, a rear driving axle and housing therefor, a rotatable shaft having operative connection with said axle and provided with a fixedly mounted sprocket wheel, a sub-frame fixedly connected at its rear end to said housing and connected at its front end to said main frame, a motor provided with a shaft having a fixedly mounted sprocket wheel, a chain, adjustable means for connecting said motor to said sub-frame, and said chain providing operative connection between said sprocket wheels.

4. In a motor vehicle provided with a rear driving axle, a housing therefor, a main frame and spring means connecting said frame to said housing; a motor-supporting and driving-thrust sub-frame fixedly connected at its rear end to said housing and pivotally and non-longitudinally movably connected at its forward end to said main frame and adapted to communicate the longitudinal driving-thrust from said housing to said main frame, and a motor adjustably connected to said sub-frame and operatively connected to said driving-axle.

5. In a motor vehicle of the character described, in combination with a main frame, a driving axle, a housing therefor, a worm wheel on said axle, and a shaft provided with a worm meshing with said worm wheel, a sub-frame comprising two spaced longitudinally disposed members connected at their rear ends to said housing and at their forward ends to said main frame, a motor mounting yoke extending from one member of said frame to the other member and fixedly connected thereto, a motor connecting arm connected to said yoke and extending upwardly at one end of the same, a vertically disposed screw threaded adjusting stem connected to the other end of said yoke, an electric motor provided with a hinge motor bracket pivotally connected to said motor connecting arm and with an adjusting motor bracket provided with a vertically disposed aperture receiving said adjusting stem, said shaft provided with a sprocket wheel, the armature shaft of said motor located above said shaft and provided with a sprocket wheel, a chain belt connecting said sprocket wheels, and adjusting nuts upon said adjusting stem, whereby said motor with its armature shaft may be adjusted with reference to said first mentioned shaft.

6. In a motor vehicle the combination of a rear driving axle, a worm wheel in operative connection therewith, a worm shaft provided with a worm meshing with said worm wheel, a sub-frame connected to said axle and to the main frame of the vehicle and constituting the sole motor-supporting and driving-thrust-communicating means, an electric motor mounted upon said sub-frame and having its armature shaft parallel with and above said worm shaft, and chain belt operative connection between said armature shaft and said worm shaft.

7. A motor vehicle comprising, in combination with a rear driving axle and housing therefor, a worm wheel in operative connection with said axle, a worm shaft provided with a worm meshing with said worm wheel, a combined motor-supporting and driving-thrust sub-frame fixedly connected at its rear end to said housing and non-longitudinally-movably connected at its forward end to said main frame, an electric motor mounted upon said sub-frame, and chain belt operative connection between said motor and said worm shaft.

8. In a motor vehicle having a main frame, in combination with a rear driving axle, a worm wheel in operative connection therewith, a housing for said axle, a differential gear case connected to said housing, a worm case connected to said gear case, a worm shaft journaled in radial and thrust bearings in said worm case and provided with a worm meshing with said worm wheel, a sub-frame connected at its rear end to said axle housing and at its front end to said main frame intermediate the front and rear wheels and constituting the sole means for imparting the driving thrust from said housing to said main frame, an electric motor mounted upon said sub-frame, and the armature shaft of said motor operatively connected to said worm shaft.

In testimony that I claim the above, I have hereunto subscribed my name in the presence of two witnesses.

LEROY S. PFOUTS.

Witnesses:
JOHN H. BISHOP,
WILLIAM H. MILLER.